No. 871,496. PATENTED NOV. 19, 1907.
A. R. A. GERARD.
PROTECTION OF RAILWAY TRAINS.
APPLICATION FILED MAY 1, 1906.

7 SHEETS—SHEET 1.

WITNESSES:

INVENTOR
Abel R. A. Gerard
BY
ATTORNEYS.

No. 871,496. PATENTED NOV. 19, 1907.
A. R. A. GÉRARD.
PROTECTION OF RAILWAY TRAINS.
APPLICATION FILED MAY 1, 1906.

7 SHEETS—SHEET 2.

WITNESSES:

INVENTOR
Abel R. A. Gérard
BY
ATTORNEYS.

No. 871,496. PATENTED NOV. 19, 1907.
A. R. A. GÉRARD.
PROTECTION OF RAILWAY TRAINS.
APPLICATION FILED MAY 1, 1906.
7 SHEETS—SHEET 3.
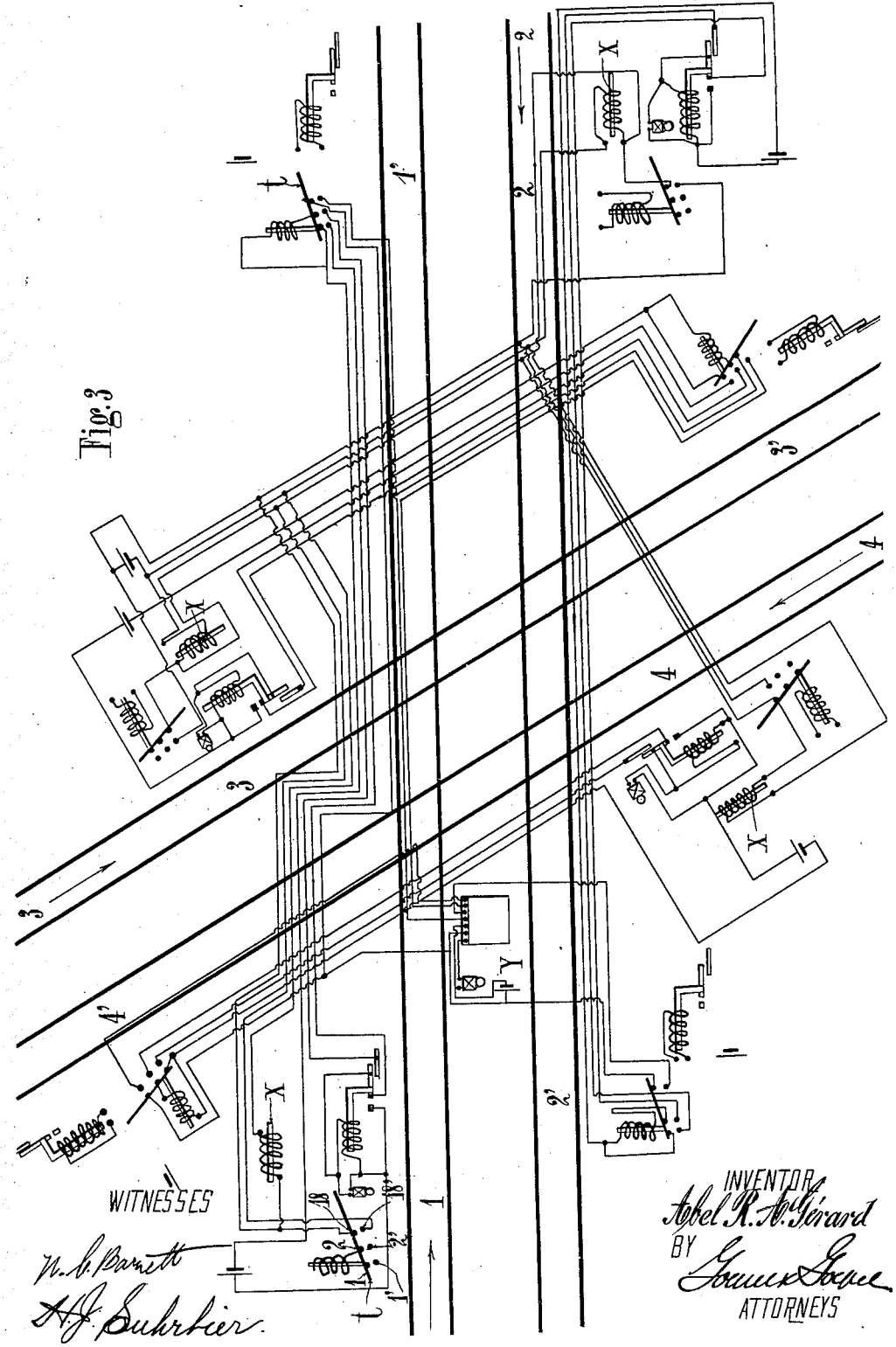

No. 871,496. PATENTED NOV. 19, 1907.
A. R. A. GÉRARD.
PROTECTION OF RAILWAY TRAINS.
APPLICATION FILED MAY 1, 1906.
7 SHEETS—SHEET 4.
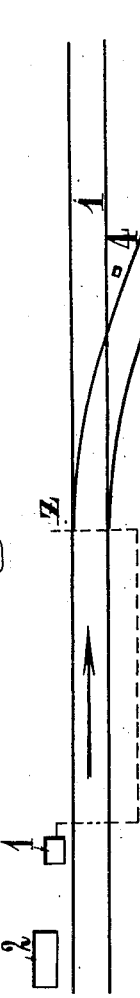
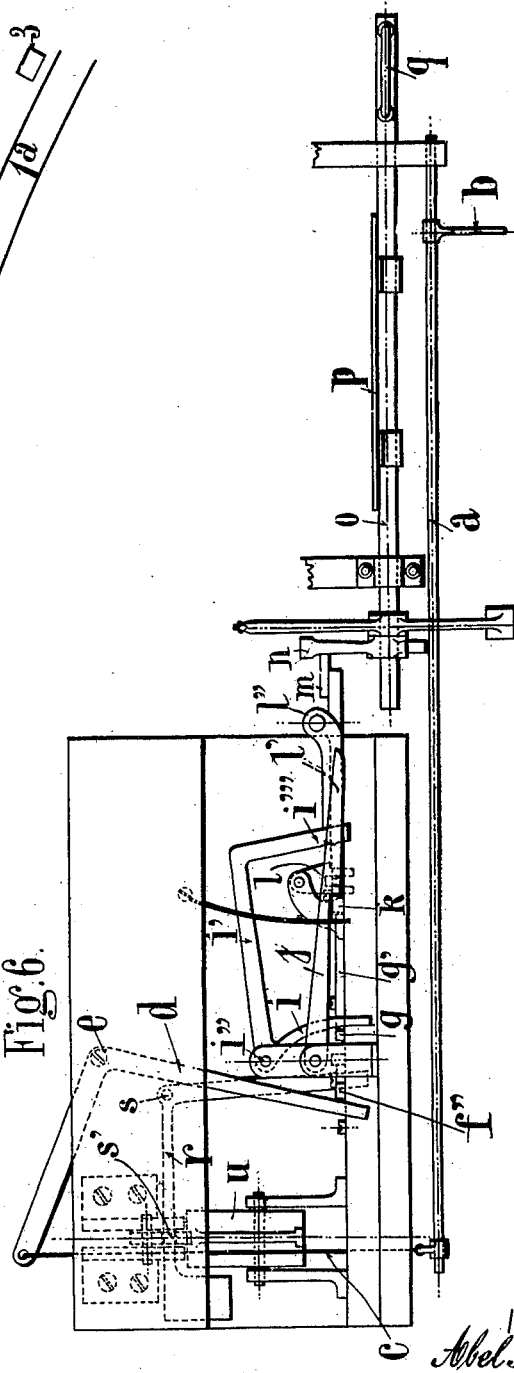
WITNESSES:
INVENTOR
Abel R. A. Gérard
BY
ATTORNEYS.

No. 871,496. PATENTED NOV. 19, 1907.
A. R. A. GÉRARD.
PROTECTION OF RAILWAY TRAINS.
APPLICATION FILED MAY 1, 1906.
7 SHEETS—SHEET 5.
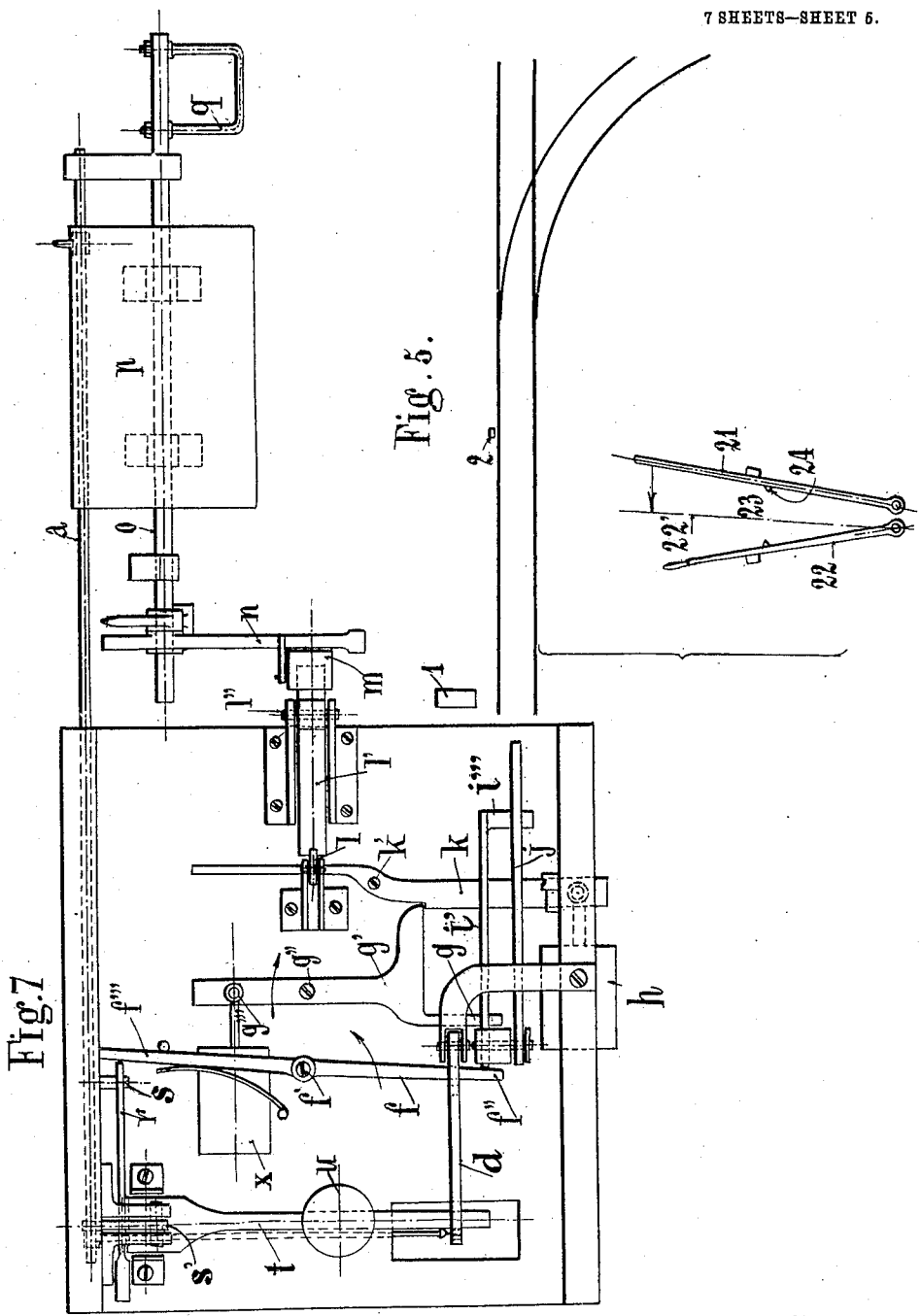

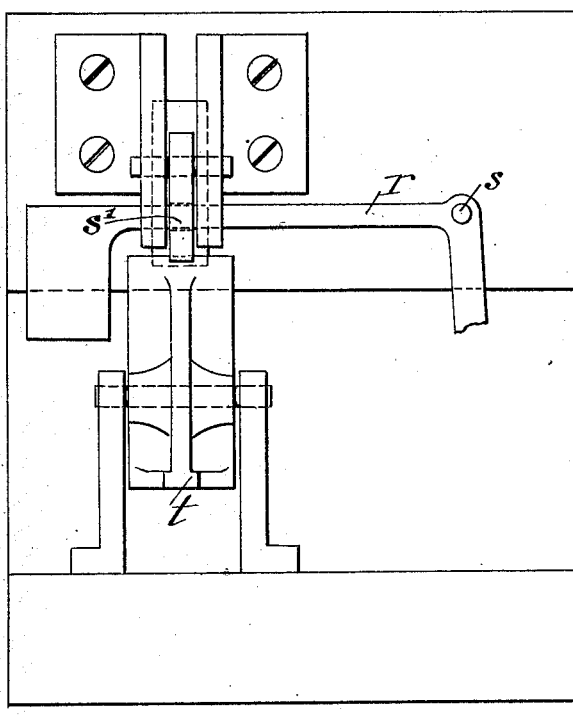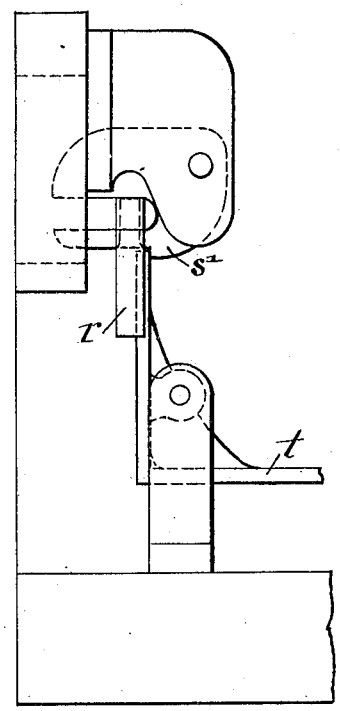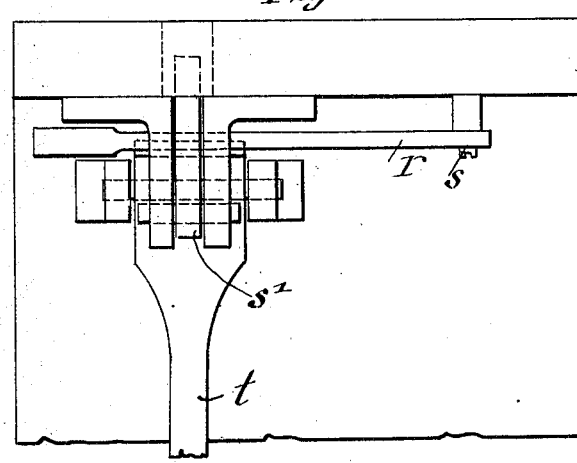

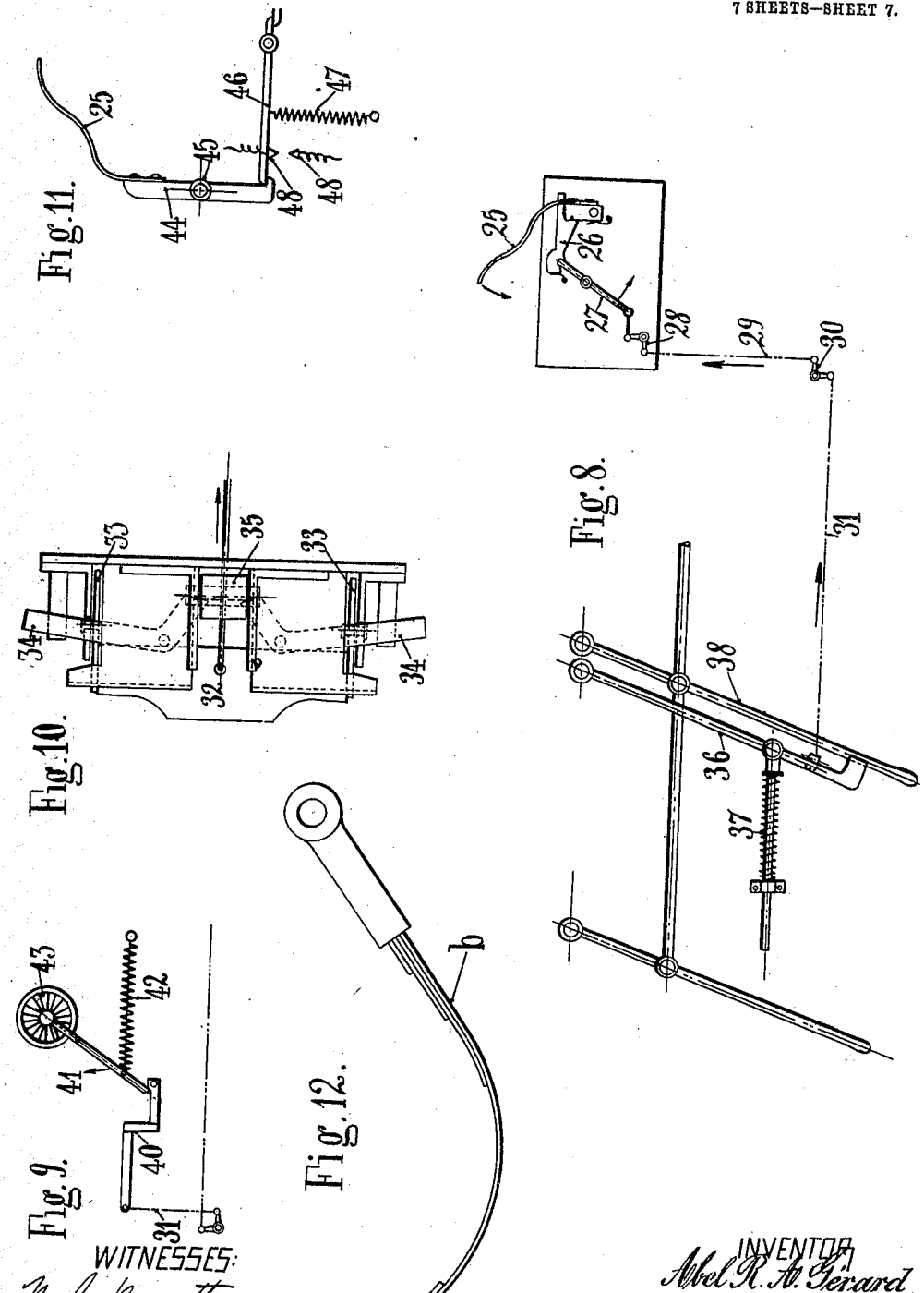

UNITED STATES PATENT OFFICE.

ABEL RAIMOND ALEXANDRE GÉRARD, OF PONTGIVART, NEAR REIMS, FRANCE.

PROTECTION OF RAILWAY-TRAINS.

No. 871,496.　　　　Specification of Letters Patent.　　　　Patented Nov. 19, 1907.

Application filed May 1, 1906. Serial No. 314,639.

*To all whom it may concern:*

Be it known that I, ABEL RAIMOND ALEXANDRE GÉRARD, a citizen of the Republic of France, and resident of Pontgivart, près Reims, France, have invented a new and useful Improvement in Protection of Railway-Trains, which improvement is fully set forth in the following specification.

This invention relates to a system for protecting trains running on railway tracks, based, like the chief systems at present in use, on the division of the line into sections. The system is semi-automatic, that is to say, after having passed one section, the train itself effects the operation for covering itself, and the operations necessary to complete the system of protection are effected by electric means or otherwise, as will be hereinafter explained. At each post or section there must therefore be a man who will complete the protective operations in each case.

The system of protection according to this invention is illustrated, by way of example, in the accompanying drawing.

Figure 1:
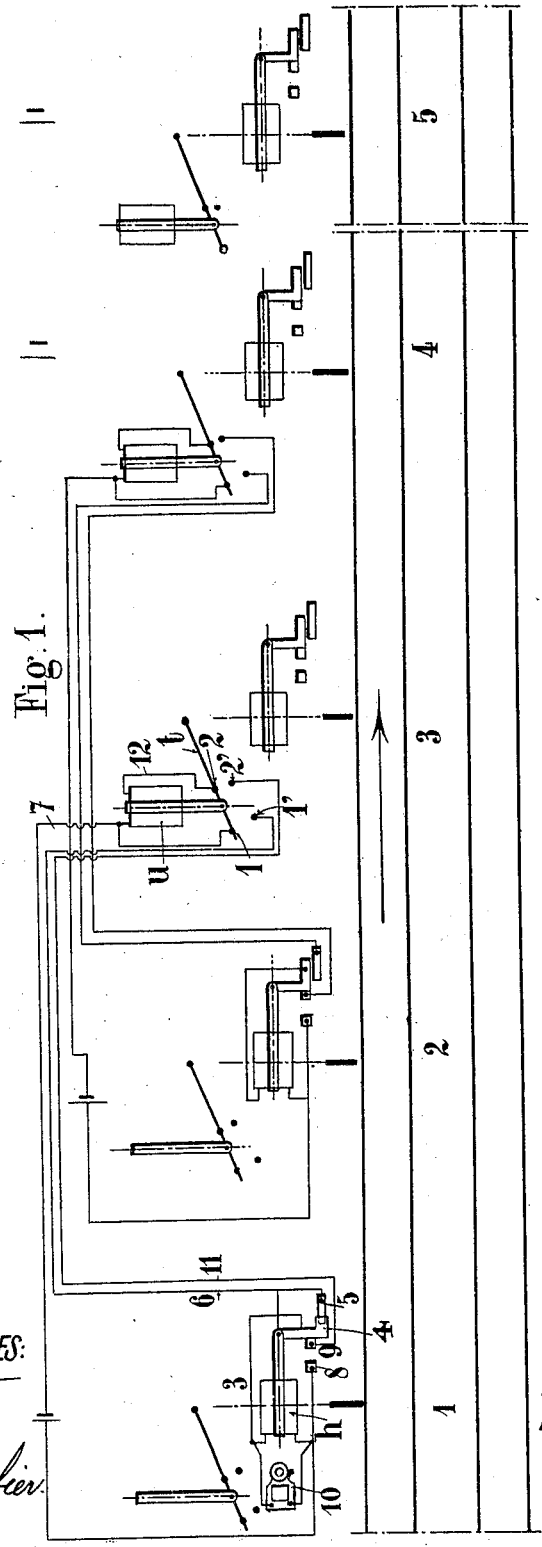
Figure 2:
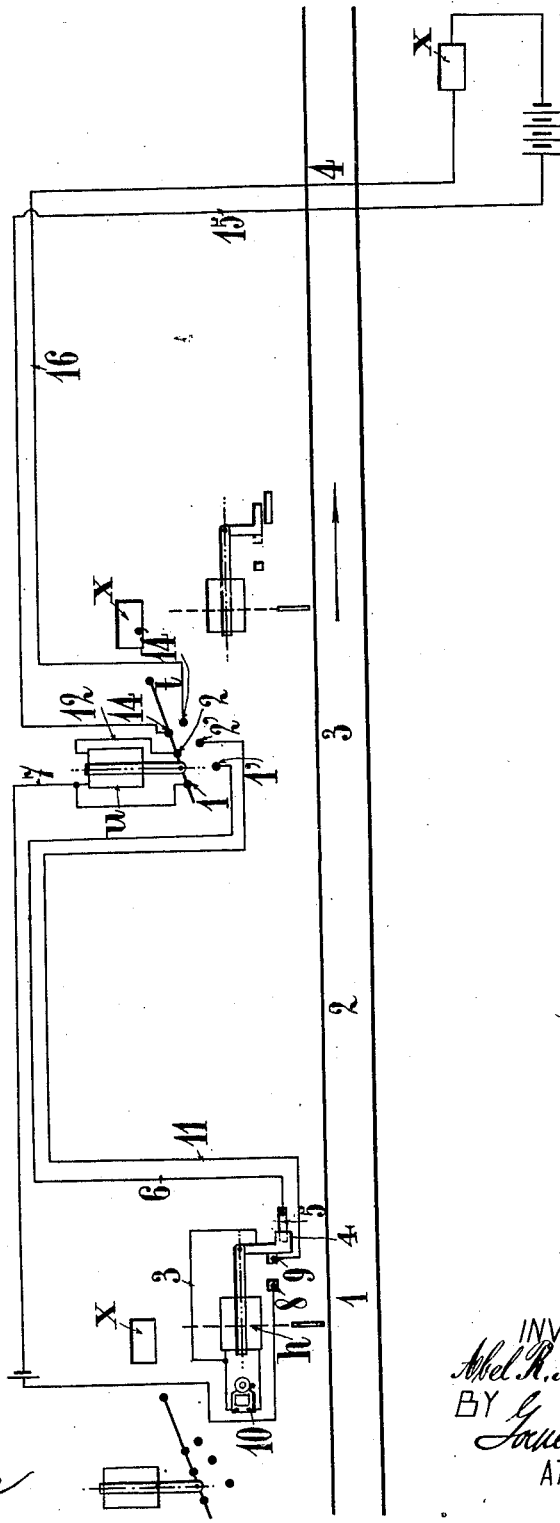

Figure 1 is a diagrammatic view showing the whole system applied to a double track; Fig. 2 is also a diagrammatic view showing the application of the system to a single track; Fig. 3 is a diagrammatic view of the system adapted for crossings; Fig. 4 is a diagrammatic view showing the system applied to a siding; Fig. 5 is a diagrammatic view showing the arrangement used for dangerous curves; Figs. 6 and 7 are respectively an elevation and plan of one of the posts or signal boxes. In these figures, the electric transmission and contacts are not shown; Figs. $7^a$, $7^b$ and $7^c$ are detail views of the apparatus shown in Figs. 6 and 7; Fig. 8 is a detail view showing the parts arranged on the locomotive in order automatically to produce the closing of the governor after the train passes a blocked post; Fig. 9 is a modification of Fig. 8; Fig. 10 is a detail view of the bolt or latch applied to the device shown in Fig. 8 and intended to lock the lever controlling the arm of the regulator; Fig. 11 is a modification of the stopping device arranged on the locomotive; Fig. 12 is a detail view of the arm arranged at each post, on which, on the passing of each train, a part secured to the rear car or to the tender acts.

Before examining in detail the working of the system in its various practical applications, that is to say for a double track, single track, crossings, points, etc. it is necessary to give a complete description of one of the posts or signal-stations. By examining the various practical cases, it will then be easier to understand the modifications or alterations to be made in these posts in order to render them suitable for their work.

In principle, a post comprises chiefly a horizontal arm $a$, Figs. 6 and 7, extending on the left hand side of the track at a suitable level. This arm $a$ carries a bent or curved rod $b$ which is the stop rod shown in detail in Fig. 12, and on which acts the part placed on the tender or on the rear car, when a train is passing.

The arm $a$ is connected by a chain $c$ to a bell crank lever $d$ pivoted about a fixed point $e$. This lever $d$ presses with its lower arm against a lever $f$ pivoted at $f^1$. The lever $f$ when pushed by the lever $d$ in the direction of the arrow in Fig. 7, strikes with its end $f''$ the arm $g$ of a part $g'$ movable about the point $g''$ and connected at $g'''$ to the core of a coil $x$. The portion $g$ of the part $g'$ also rests against the bent arm $i$ of an angle $i'$ movable about the point $i''$. The end $i'''$ of the said angle is bent so that when it turns about its pivot $i''$, it raises the locking part $j$ which normally locks the lever $k$. In moving from left to right (Fig. 7), owing to the movement of the lever $f$ in the direction of the arrow, the part $g'$ first raises, by means of the angle $i'$, the locking bar $j$, then slightly pushes the rod $k$ which turning about the center $k'$, disengages the small bolt or latch $l$ which, in its turn, releases the large latch $l'$ which can pivot at $l''$ and against the end of which rests a part $m$ hinged to the arm $n$ secured to a bar or spindle $o$ parallel to the rod $a$ and arranged at any suitable level. The spindle $o$ carries the danger disk $p$ and a bracket $q$ the object of which will be hereinafter described. Moreover, during its movement in the direction of the arrow, the lever $f$ acts with its end $f'''$ against an angle part $r$ pivoted at $s$. Owing to the rising of the horizontal arm of this angle lever, a latch $s'$ is raised, and an arm $t$ being no longer held by the latch $s'$, falls freely under the influence of its weight. It must be pointed out that the said arm $t$ is also connected to the core of a coil $u$. Such are the mechanical arrangements at each post. Their object will be understood when examining the working of the system for double or single tracks.

*Double track case, Fig. 1.*—Let us assume that a train is going in the direction of the arrow and passing the post No. 3. This train, by means of the part arranged on the tender or on the last car, strikes the stop b, causing the arm a of the post to rotate. This arm a, on turning, pulls, by means of the chain c, the angle d which, in moving about its pivot e turns the lever f which produces the double effect already described, viz:

1. It pushes with its end f'' the portion g of the part g', and consequently acts on the angle i' which raises the locking bar j, and at the same time the part $g^1$ pushes the lever k released by the locking part j. The small bolt l being freed, the large bolt or latch l' is released, and the spindle o on which is placed the disk p, rotates so as to place that disk p into the "danger" position.

2. It acts by means of the end f''' on the bolt locking the bar t, which, owing to its weight, falls down closing electric contact 1 1' 2 2'. The contacts 1 and 2 are carried by the bar t, while the contacts 1' and 2' are fixed to any suitable part.

It will thus be seen that at the moment of the passage of the train, the disk p of the post No. 3 is placed in the "danger" position, and that a double electric contact 1 1' 2 2' is closed. Owing to the closing of this double electric contact, a current starting from the positive pole of the battery arranged at the post No. 1 will pass through the coil h of the said post and come out through the wire 3 of the contacts 4 and 5. Through the wire 6, the current will pass to the contact 1', into the contact 1, and return through the wire 7 to the negative pole of the battery. The coil h of the post No. 1 through which an electric current has passed, will attract its core, the results of which will be that the contacts 4 and 5 will be at once opened and the contacts 8 and 9 closed. At the same time, owing to the movement of the core of the coil h, the lever g' at the post No. 1 will turn in the direction of the arrow Fig. 7, with the result that the locking bar j will be returned to its original position, so as to secure the rod k and bring the bolt l above the large bolt l'. A bell 10 arranged in shunt on the electric circuit described, will notify the signalman at the post No. 1 that his apparatus has been operated by the post No. 3. By acting then on some suitable mechanical gear, he can turn the spindle o carrying the disk p of his post, and his disk will remain in the "line clear" position as the bolt l' is again locked by the bolt l.

It will be seen that during the passage of the train from the post No. 1 to the post No. 3, the disk p of the post No. 1 remains in the "danger" position and that the signalman could never set or keep it in the "line clear" position until the train passing post No. 3, has effected the movement of the core of the coil of the post No. 1, enabling the lock l' of the said post to be again locked. The movement of the core of the coil or the post No. 1 also results, as already stated, in closing the contacts 8 9. A current starting from the positive pole of the battery of the post No. 1, arrives at the contact 8, passes to the contact 9, through the wire 11 to the contact 2', through contact 2, through wire 12, thence through the coil u of the post No. 3, and out through the wire 7 to the negative pole of the battery. The core of the coil u is then attracted, the contacts 1 1' 2 2' are at once broken, and the bar t resumes its locking position.

It will be seen from the preceding that as the train passes each post to the right it mechanically protects itself at the said post by placing the disk into the "danger" position, and at the same time the train produces electrically at the last post but one preceding that which it has just passed, the locking of the bolts l' and the ringing of a bell which notifies the signalman at that post that he can again throw into gear, that is to say, put the disk p into the "line clear" position. Thus no accident is possible, for the signalman in the box No. 1 cannot open the line until the train has passed the post No. 3. If, by any chance, the signalman, having gone away from his box, does not hear the bell and, not knowing whether the train has passed the box No. 3, tries to open the line, he will be unable to do so unless the train has really passed the box No. 3. The working thus takes place from box to box in exactly the same manner.

*The case of a single track.*—The system is here absolutely the same, except, however, that the train must protect itself in front, for it is exposed to the danger of meeting a train coming in the opposite direction. This is effected by providing the lever t with two more contacts, and each post with a coil x the core of which is connected at g''' to the part g', so that when the core of the coil is attracted, it produces movement of that part in the direction opposite to that of the arrow in Fig. 7, that is to say it makes the part act in the same way as when it is mechanically pushed by the lever f.

In the single track arrangement, the posts or boxes of odd numbers are arranged on the left hand side relatively to the direction of the arrow in Fig. 2, and the even posts on the right hand side. Let us assume that a train is traveling in the direction of the arrow in Fig. 2, and arrives at the right of the post No. 3. It acts, by means of the part arranged on the rear car or on the tender, on the stop b, the result of which action, as already stated, is to set the disk p of the said post into the "danger" position, and at the same time to bring about the fall of the arm t. This arm t, when falling, closes, as before, the contact 1 1' 2 2', which close two electric circuits of the battery of the post No. 1 with the following result: (1) One circuit produces the locking of the system at the post No. 1, enabling the disk p of the said post to be put into the "line free" position, and the other operates the coil which then raises the arm t of the post No. 3. But, in addition to that, when the arm t falls, the parts 14 and 14' come into contact, and current from the battery of the post No. 4, passes through the wire 15 to the contact 14, then into the contact 14' and through the wire 16 into the coil x of the post No. 4, and returns to the negative pole of the battery. The coil x of the post No. 4, as soon as a current passes through it, attracts its core and consequently turns the part g' in the direction opposite to that of the arrow in Fig. 7, the result of which is that the part g' acts in the same way as if it were pushed mechanically by the lever f, so that the lock l at the post No. 4 is withdrawn and, under influence of the weight of the arm n operating the disk p, this disk is set in the "danger" position protecting the track in front. It goes without saying that, instead of taking place at the post No. 4 following immediately the post No. 3, these actions could take place two, three or four posts further in front. It would be sufficient for the purpose to arrange the electric connections in a corresponding manner.

The arrangement for crossings is shown in Fig. 3. It is unnecessary to describe again the general working of the apparatus. It will be sufficient to describe the modifications made in the posts arranged in the neighborhood of the crossings, and the new actions that take place. Let us assume that a train is approaching the crossing along the track 1. Its passage to the right of the post No: 1 causes the disk of the said post, as well as the bar t, to fall mechanically, as already stated. On the said bar t are, as before, contacts 1 1' 2 2' and finally a new set of contacts 18 18'. The fall of the bar has the following results. (1) the locking of the disk of the preceding, or the last but one post, according to the electric connections: (2) the raising of the bar t of the post passed: (3) finally, by means of the contacts 18 and 18', and electric connections which will be described, the electric closing of the opposite tracks by the working of the electromagnets x. These electromagnets x are mounted in the same way as in the case of a single track, and act by means of independent batteries. The electromagnets or coils x of the posts 3, 3' and 4, as shown by the connection diagram, are operated by the closing of the contacts 18 and 18' of the post No: 1. These electro-magnets x operate the bars g' of the different posts in the same way as if they were pushed mechanically in the direction opposite to that of the arrow in Fig. 7, so that the disks p of the posts 2, 3 and 4 fall down and close the tracks. No train will, therefore, be able to pass the crossing. The train which was opposite the station 1, and which has produced the results just described, passes the crossing and then arrives at the right of the box 1. In passing to the right of the said box, it produces, as in the general case, the falling of the disk and of the bar t of the said post. This bar t, in falling, produces the well known results at the post 1', but at the same time the contacts arranged on the bar t exhibit at the central station y, on a bell indicator board, a number indicating that the crossing has just been released by a train which has passed the box 1. The signalman at the central station y notifies electrically the signalmen of the boxes 2, 3 and 4 to raise their disks, so that the whole is again ready for the passage of a new train by any of the four lines.

The case of a siding will now be considered. The switch z (Fig. 4) having been arranged so as to give the train access to the siding 1ª, the disk 1 is mechanically lowered from a distance by the same lever that operates the switch or points. If desired, the said disk could be lowered electrically. On the contrary, if the points are not set, that is to say, if the track 1 is left in the normal position, the disk will remain open, and in that case a train coming in the direction of the arrow, will be able to pass the points without going on the siding. If, for service reasons or for allowing an express to pass, it is desired to switch the train, the line superintendent causes the train to be stopped in ordinary manner at the station without setting the points. This train is then protected by the box No: 2 and the preceding box. In order to shunt the train, the points are then set, the result of which operation is that the disk of the box No: 1 is set at "danger". The train is shunted to the siding, and at the same time, the line superintendent, by sending an electric current into the box No: 2 and the preceding one, opens the track to these two boxes, but the line is still closed by the disk at the box No: 1 being at "danger", and no train can pass the points as long as the said disk remains open, that is to say, until the line No: 1 has resumed the normal position, by the points being set. Instead of raising the disks of the box 2 and the preceding one by sending a current by the line superintendent, the train, in coming to the siding, could itself effect that operation. In that case the shunted train, on arriving at the box No: 3 would effect the operations already described for again locking the disks 2 and the preceding one. This system of protection can also be supplemented by a box 4 arranged at the beginning of the siding which will always remain in closed position, so that, if a train passed to the siding when it should not, the post would act automatically on the parts of the locomotive, as will be hereinafter described, and stop the train.

When a train arrives at the beginning of a dangerous curve, which is notified the driver by a signal arranged at 1, Fig. 5, as on existing lines, the driver has to slacken speed. If, for some reason or other, the driver omits to do so, a stop 2 arranged on the track at a suitable level acts on lever 21 which is a duplicate of the lever of the throttle-valve, Fig. 5. If the lever 22 of the throttle-valve has remained in the position 22' corresponding to full speed, the lever 21, having been operated by the stop 2, moves in the direction of the arrow and closes the admission of steam to the necessary extent to reduce the speed, and at the same time closes, by coming in contact with the lever 22 which has remained in that position, the contacts 23 24 which close a circuit on a recording instrument which, when the engine arrives at the depot, will enable the want of attention of the driver to be seen. If, on the contrary, on arriving to the right of the disk 1, the driver has moved the lever 22, so as to reduce the speed by bringing the lever into the position shown in full lines in Fig. 5, the action of the stop 2 on the lever 21 will not affect the recording instrument, as the contacts 23 and 24 will not be closed.

It will be obvious that the action produced by fixed stops on the controlling parts of the locomotive, could be produced by some other means. Figs. 8 to 11 give, by way of example, some such devices. It must be remembered first of all, that each spindle o arranged at any post, carries at q a bracket which, when the disk is raised, that is to say, the line closed, comes into vertical position relatively to the line. If a train, arriving to the right of a post, the disk of which is closed, passes beyond it, in spite of the closing of the post, the bracket q acts on a rod 25 arranged on the locomotives. This rod, by turning in the direction of the arrow Fig. 8, forces the part 26 to rise and a balance beam 27 to turn in the direction of the arrow. The bell crank lever 28 then pulls, in the direction of the arrow a cable 29 which, by means of a bell crank lever 30, pulls another cable 31. This moves the part 32 (Fig. 10) which, on moving, turns a rod 33 which pushes the arms 34 which, on turning, disengage a lock 35. The whole of the arm 36 acting then on the arm 38 of the throttle-valve, being no longer held by the lock 35, can move under the action of the spring 37. Steam is thus cut off, and the engine automatically stopped. In order to bring the system again into position ready for action, it is sufficient to compress the spring 37 until the arms 34 are again set. As shown in Fig. 9, the cable 31 could also act on a bent lever 40, which, on being lowered by the pull on the cable 31, would disengage a rod 41, which, under the action of a spring 42, would shut off steam at 43. Instead of having some mechanical gear as described, the same result could be obtained electrically. For instance the arm 25 operated by the stop q could produce on the locomotive the rotation of an arm 44 about its pivot 45. The arm 44, on rotating, disengages a lever 46 which, under the influence of the action of a spring 47, closes two contacts 48, 48. These contacts close an electric circuit which can operate either the parts of the governor, or signals. Finally, as on the locomotive there are frequently parts having a reciprocating movement (or such parts could be easily arranged if there were not any) it will be understood that it will be possible to arrange a rod with a notch which normally would be kept away from the part having a reciprocating movement, but, on falling, owing to the striking of the bracket q or of any other suitable part, would be caused to reciprocate together with the reciprocating part on the locomotive. The movement of the said notched bar would then produce the desired effect on the governor. As regards the position of the parts, it will be understood that they can be arranged at the sides of the track, above or below, or between the tracks, also above or below.

Having thus described my invention, I claim as new and desire to secure by Letters Patent:

1. In a system for protecting railway trains, a line divided into blocks or sections by a plurality of stations or posts, each of such stations comprising a signal device normally set in danger position, a locking device whereby each such signal is locked in safety position, means operated by the train in passing each station to release the locking means at such station, an electrical contact device at each station also operable by the train, and electrical connections between said contact device and a station at the rear for returning the locking mechanism at the latter station into such position as to lock the signal at such station in safety position, and to return the contact device at the former station to its initial position.

2. In a railway signaling apparatus, a line divided into blocks or sections by a plurality of signal-stations, a signal at each station normally set in danger position, means for locking each signal in safety position, a contact device at each station, electrical connections between each contact device and the locking mechanism of a station in the rear whereby such locking mechanism is returned into position to lock the signal of such station in the rear in safety position, and a single means whereby the locking mechanism at each station and the corresponding contact device are simultaneously operated by the passing of the train.

3. In a railway signaling system, a line divided into blocks or sections by a plurality of signal-stations, a signal at each station normally in danger position, means to lock each such signal in safety position, a gravity-operated contact device at each station, a latch for controlling said contact device, electrical connections between each contact device and the locking mechanism of a station in the rear whereby when contact is made the signal at the last-named station may be manually set into position to indicate safety and locked in such position, means for simultaneously releasing the locking mechanism at each station and the contact device, and a device operated by the train in passing which operates said means.

4. In a railway signaling system, a line divided into blocks or sections by a plurality of signal-stations, a signal at each station normally set to indicate danger, means for locking each signal in safety position, a gravity-operated contact device at each station, electrical connections between each contact device and the locking mechanism of a station in the rear whereby the signal at such station may be set and locked in safety position, electrical connections whereby the contact device at the first-mentioned station is returned to its initial position, and mechanism at each station whereby on the passing of a train the locking mechanism and the contact device at said station are simultaneously released.

In testimony whereof I have signed this specification in the presence of two subscribing witnesses.

ABEL RAIMOND ALEXANDRE GÉRARD.

Witnesses:
EMILE LEOBRET,
HERNANDO DE SOTO.